United States Patent
Gu et al.

(10) Patent No.: US 9,949,303 B2
(45) Date of Patent: Apr. 17, 2018

(54) SHORT RANGE WIRELESS COMMUNICATION SYSTEM FOR A VEHICLE

(71) Applicant: GM Global Technology Operations LLC, Detroit, MI (US)

(72) Inventors: Wen Gu, Novi, MI (US); David P. Pop, Garden City, MI (US); Amanda J. Kalhous, Ajax (CA); Robert A. Hrabak, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/144,460

(22) Filed: May 2, 2016

(65) Prior Publication Data

US 2017/0318612 A1 Nov. 2, 2017

(51) Int. Cl.
| | |
|---|---|
| *H04B 7/00* | (2006.01) |
| *H04W 76/02* | (2009.01) |
| *B60R 25/24* | (2013.01) |
| *H04W 4/00* | (2018.01) |
| *H04W 4/04* | (2009.01) |
| *H04W 52/02* | (2009.01) |

(52) U.S. Cl.
CPC .......... *H04W 76/021* (2013.01); *B60R 25/24* (2013.01); *H04W 4/008* (2013.01); *H04W 4/046* (2013.01); *H04W 52/0206* (2013.01)

(58) Field of Classification Search
CPC ... H04W 76/021; H04W 4/008; H04W 4/046; H04W 52/0206; B60R 25/24
USPC .......................................................... 455/41.2
See application file for complete search history.

(56) References Cited

U.S. PATENT DOCUMENTS

| | | | |
|---|---|---|---|
| 7,623,552 B2 * | 11/2009 | Jordan | H04J 3/0682 370/503 |
| 2014/0191875 A1 * | 7/2014 | Wedig | G08B 7/066 340/628 |
| 2016/0057722 A1 * | 2/2016 | Premy | H04W 56/0015 370/315 |

* cited by examiner

*Primary Examiner* — Eugene Yun
(74) *Attorney, Agent, or Firm* — David Willoughby; Reising Ethington P.C.

(57) ABSTRACT

A short range wireless communication (SRWC) system for a vehicle and a method of using the SRWC system. The system includes a first SRWC node in the vehicle having a SRWC receiver and a SRWC transmitter, and a second SRWC node in the vehicle adapted to send and receive SRWC data. The first and second SRWC nodes are configured so that when the first and second SRWC nodes are operable, an SRWC object device perceives the first and second SRWC nodes as a single SRWC device.

9 Claims, 5 Drawing Sheets

SHORT RANGE WIRELESS COMMUNICATION SYSTEM FOR A VEHICLE

TECHNICAL FIELD

The present invention relates to vehicle short range wireless communication (SRWC) systems adapted to communicate with SRWC-enabled mobile devices and SRWC-enabled infrastructure.

BACKGROUND

An operator of a vehicle may use a mobile device to perform a variety of vehicle functions. For example, the mobile device may communicate with the vehicle to start the vehicle or unlock a vehicle door. It is desirable to be able to perform these and other vehicle functions based in part on the operator's proximity to the vehicle. The mobile device may communicate with a backend system which may send a cellular message to the vehicle thereby starting the vehicle or unlocking the door. In some instances, cellular service may be unavailable. Hence, there is a need to provide a means to provide such services to the user in the absence of cellular communication.

SUMMARY

According to an embodiment of the invention, there is provided a short range wireless communication (SRWC) system for a vehicle. The system includes: a first SRWC node in the vehicle having a SRWC receiver and a SRWC transmitter; and a second SRWC node in the vehicle adapted to send and receive SRWC data, wherein the first and second SRWC nodes are configured so that when the first and second SRWC nodes are operable, an SRWC object device perceives the first and second SRWC nodes as a single SRWC device.

According to another embodiment of the invention, there is provided a short range wireless communication (SRWC) system for a vehicle. The system includes: one or more SRWC end nodes in the vehicle; and a SRWC gateway node in the vehicle, the gateway node comprising memory having instructions stored thereon and a processor adapted to read and carry-out the instructions. The instructions include: communicating with an SRWC object device via the gateway node using a SRWC protocol; receiving SRWC parameter data associated with the object device at the gateway node from the one or more end nodes; and based on the communication and based on the SRWC parameter data, performing a vehicle function, wherein, during the communicating step, the one or more end nodes and the gateway node present as a single SRWC device to the object device.

According to another embodiment of the invention, there is provided a method of communicating with a short range wireless communication (SRWC) object device using a SRWC system in a vehicle. The method includes: receiving a SRWC signal from the object device at a SRWC first node in the vehicle; in response to receiving the SRWC signal at the first node, waking up a SRWC second node in the vehicle; and establishing a SRWC link between the second node and the object device based on a previous identification of the object device at the vehicle, wherein the first and second nodes present as a single SRWC device to the object device.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

A short range wireless communication (SRWC) system and method of using the system are described below. In at least one implementation, the SRWC system utilizes a Bluetooth Low Energy (BLE) protocol; however, this is not required. The SRWC system includes multiple SRWC nodes which can transmit and receive data according to a common SRWC protocol, but which present to other devices as a single SRWC entity. For example, although each of the SRWC nodes may transmit SRWC signals, an object device (e.g., a non-vehicular SRWC device) will only perceive the SRWC system as a single node or a single SRWC device. As will be described below, one of the SRWC nodes may be a gateway or central node—e.g., which directly communicates with the object device. The remaining SRWC nodes (or end nodes) may be used for a variety of purposes. For example, the end nodes may be used to determine the location of the object device relative to the vehicle and provide that information to the gateway node. Or for example, at least one end node may be operable even when the vehicle ignition is OFF; this end node may wake-up the other end nodes and/or the gateway node upon receiving a wireless signal from the object device. Further, as will be explained below, the SRWC system may be responsible for providing various application program interface (or API) data to one or more system modules in the vehicle, wherein the API data is used to carry-out various vehicle functions, vehicle services, and the like.

Communications System

Figure 1:
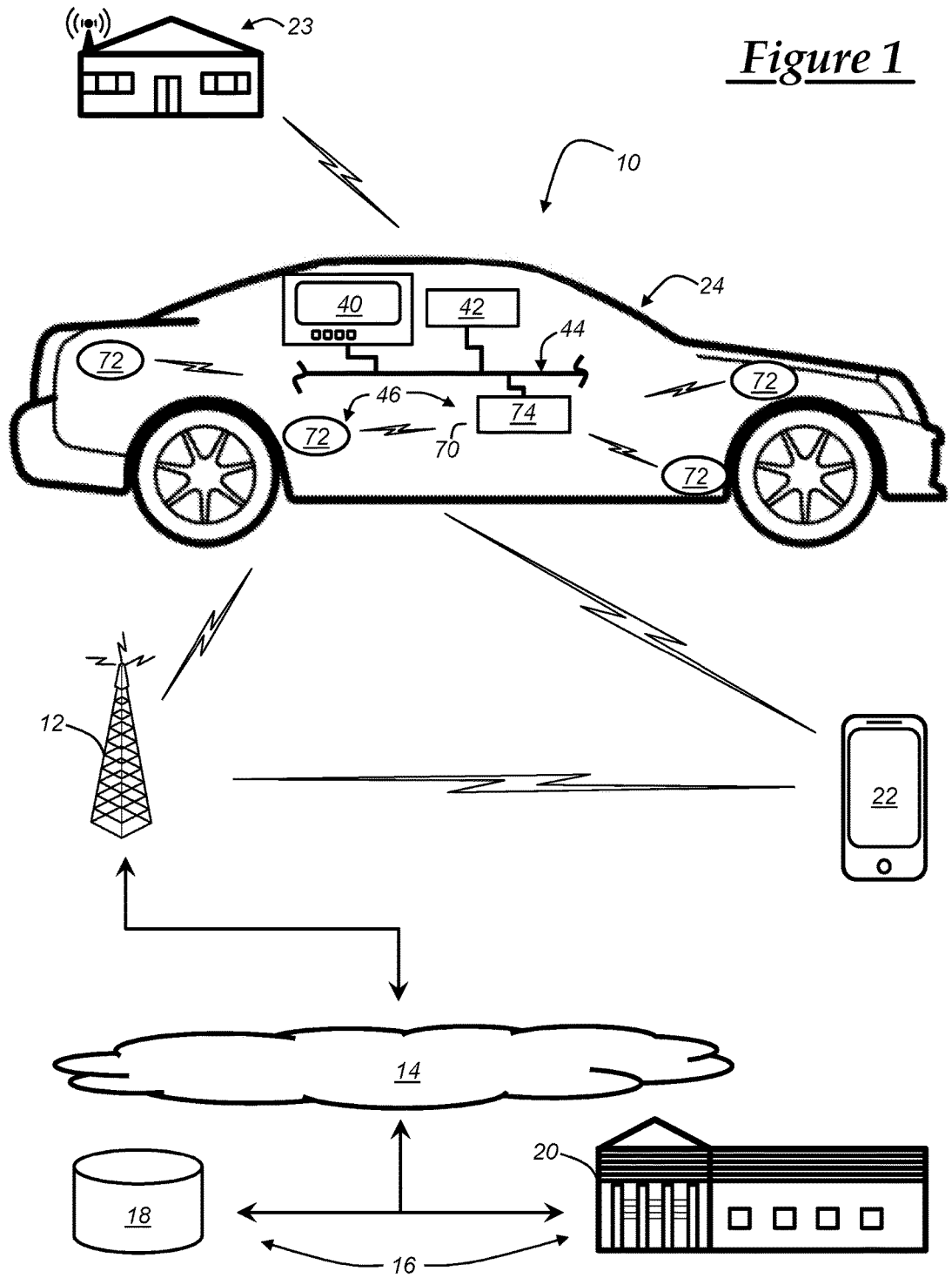
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes: one or more wireless carrier systems 12; a land communications network 14; a backend system 16 that includes at least one of a remote server 18 or a data service center 20; a mobile device 22; a wireless infrastructure 23; and a vehicle 24. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 12 is preferably a cellular telephone system that includes a plurality of cell towers (only is one shown), one or more mobile switching centers (MSCs) (not shown), as well as any other networking components required to connect wireless carrier system 12 with land network 14. Each cell tower includes sending and receiving antennas and a base station, with the base stations from different cell towers being connected to the MSC either directly or via intermediary equipment such as a base station controller. Cellular system 12 can implement any suitable communications technology, including for example, analog technologies such as AMPS, or the newer digital technologies such as LTE, CDMA (e.g., CDMA2000), or GSM/GPRS. As will be appreciated by those skilled in the art, various cell tower/base station/MSC arrangements are possible and could be used with wireless system 12. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Land network 14 may be a conventional land-based telecommunications network that is connected to one or more landline telephones and connects wireless carrier system 12 to backend system 16. For example, land network 14 may include a public switched telephone network (PSTN) such as that used to provide hardwired telephony, packet-switched data communications, and the Internet infrastructure. One or more segments of land network 14 could be implemented through the use of a standard wired network, a fiber or other optical network, a cable network, power lines, other wireless networks such as wireless local area networks (WLANs), or networks providing broadband wireless access (BWA), or any combination thereof. Furthermore, data service center 20 need not be connected via land network 14, but could include wireless telephony equipment so that it can communicate directly with a wireless network, such as wireless carrier system 12.

Remote server 18 can be one of a number of computers accessible via a private or public network such as the Internet. Each such server 18 can be used for one or more purposes, such as a web server accessible via land network 14 and/or wireless carrier 12. Other such accessible servers 18 can be, for example: a service center computer where diagnostic information and other vehicle data can be uploaded from the vehicle 24; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 24 or data service center 20, or both. Remote server 18 can also be used for providing Internet connectivity such as DNS services or as a network address server that uses DHCP or other suitable protocol to assign an IP address to the vehicle 24.

Data service center 20 is designed to provide the vehicle 24 with a number of different system back-end functions and generally includes one or more switches, servers, databases, live advisors, as well as an automated voice response system (VRS), all of which are known in the art. These various data service center components are preferably coupled to one another via a wired or wireless local area network. Switch, which can be a private branch exchange (PBX) switch, routes incoming signals so that voice transmissions are usually sent to either the live adviser by regular phone or to the automated voice response system using VoIP. The live advisor phone can also use VoIP; VoIP and other data communication through the switch may be implemented via a modem connected between the switch and network. Data transmissions are passed via the modem to server and/or database. Database can store account information such as subscriber authentication information, vehicle identifiers, profile records, behavioral patterns, and other pertinent subscriber information. Data transmissions may also be conducted by wireless systems, such as 802.11x, GPRS, and the like. Although one embodiment has been described as it would be used in conjunction with a manned data service center 20 using a live advisor, it will be appreciated that the data service center can instead utilize VRS as an automated advisor or, a combination of VRS and a live advisor can be used.

Mobile device 22 may be any electronic device capable of cellular voice and/or data calls across a wide geographic area where transmissions are facilitated by the wireless carrier system 12. It may be configured to provide cellular services according to a subscription agreement with a third-party facility such as a wireless service provider (WSP). In addition, mobile device 22 may be electronically coupled to the vehicle 24 by wire or wirelessly via short-range wireless communication (SRWC) protocol (e.g., Wi-Fi Direct, Bluetooth, Bluetooth Low Energy (BLE), Near-Field Communication (NFC), etc.). In at least one embodiment, as described more below, the mobile device 22 communicates with a single SRWC gateway node via the BLE protocol.

Mobile device 22 may include a user interface coupled to a processor (not shown) which is configured to execute an operating system (OS) stored on mobile device memory (e.g., on a non-transitory computer readable medium of the device). The processor further may execute one or more software applications stored in device memory as well. Using such applications, a vehicle user may remotely control or communicate with vehicle 24, the backend system 16, or both (e.g., via cellular communication, SRWC, or both). For example, one application may enable the user to remotely lock/unlock vehicle doors, turn the vehicle on/off, check the vehicle tire pressures, fuel level, oil life, etc. According to one embodiment, the software application may perform at least some of the method steps described herein—e.g., sending a command or communication with may perform a vehicle function, and in one embodiment, a detected proximity of an authorized mobile device by the vehicle 24 may trigger the vehicle function (e.g., automatically). This will be described in greater detail below.

Non-limiting examples of the mobile device 22 include a cellular telephone, a personal digital assistant (PDA), a Smart phone, a personal laptop computer or tablet computer having two-way communication capabilities, a netbook computer, a notebook computer, or any suitable combinations thereof. The mobile device 22 may be used inside or outside of vehicle 24 by a vehicle user who may be a vehicle driver or passenger. It should be appreciated that the user does not need to have ownership of the mobile device 22 or the vehicle 24 (e.g., the vehicle user may be an owner or a licensee of either or both).

Wireless infrastructure 23 is a SRWC-enabled infrastructure and may be any suitable wireless transmitter or transceiver carried by a fixed, physical structure which is adapted to communicate with vehicle 24 via a short range wireless communication (SRWC) protocol. Thus, infrastructure 23 includes transmitters carried by or proximate to roadways, bridges, tunnels, buildings (e.g., businesses, residences, and the like), etc. Suitable SRWC protocols include Bluetooth, Bluetooth Low Energy (BLE), Wi-Fi, and Near-Field Communication (NFC), just to name a few non-limiting examples. In at least one embodiment, wireless infrastructure 23 communicates via the BLE protocol with vehicle 24—e.g., in a manner similar to that of mobile device 22.

Vehicle 24 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Vehicle 24 may include a number of electrical components, including but not limited to a vehicle infotainment unit 40 and one or more vehicle system modules 42 (only one is shown). Some components, such as the VIS 40 and VSMs 42 may be coupled to one or more network connections 44 (e.g., a bus, as will be described below). In addition, at least one VSM 42 may be part of or coupled to a vehicle SRWC system 46 which is used to carry out at least a portion of the method described herein.

Vehicle infotainment system (VIS) 40 may comprise a user interface and display for input/output (I/O) (not shown) and may be used to provide a number of vehicle services to users of vehicle 24 (e.g., non-limiting examples include providing audio data, video data, multi-media data, etc.). VIS 40 may be connected to network connection 44, or in at least one implementation, VIS 40 may have a wireless chipset and be adapted to communicate via a cellular link and/or a SRWC link. In at least one embodiment, the VIS 40 may store user profile information (e.g., user seat position preferences, infotainment preferences, climate control preferences, etc.). And the user may be identified and associated with the user profile using an identifier of his/her mobile device 22—e.g., making the presumption that identifying the presence of a particular mobile device also identifies the user carrying the mobile device. As will be described below, in at least one implementation, the interface and display of VIS 40 may be used to provide vehicle services to the user based on the user's preferences and the proximity of the mobile device 22 or wireless infrastructure 23.

In FIG. 1, the one or more VSMs 42 include any suitable hardware modules in the vehicle configured to perform one or more different vehicle functions or tasks—each VSM 42 having one or more processors and memory devices (not shown). A non-limiting example of a VSM is a vehicle telematics unit having a SRWC and/or cellular communication system. The communication system may include one or more wireless chipsets and may enable the vehicle to perform cellular communication over wireless carrier system 12, short range wireless communication (SRWC) with devices such as mobile device 22 or wireless infrastructure 23, or any combination thereof. It will be appreciated that other VSMs 42 may not have such a communication system (and may have other suitable features instead). Other non-limiting examples of VSMs include: an engine control module (ECM) that controls various aspects of engine operation such as fuel ignition and ignition timing; a powertrain control module (PCM) that regulates operation of one or more components of the vehicle powertrain; and a body control module (BCM) that governs various electrical components located throughout the vehicle, like the vehicle's power door locks and headlights. According to one embodiment, the ECM is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle.

Returning to FIG. 1, network connections 44 include any wired intra-vehicle communications system for connecting or coupling the VSMs 42 and other vehicle electronic devices to one another. According to one embodiment, the network connection 44 comprises a data bus (e.g., a communication bus, entertainment bus, etc.). Non-limiting examples of suitable network connections include a controller area network (CAN), a media oriented system transfer (MOST), a local interconnection network (LIN), a local area network (LAN), and other appropriate connections such as Ethernet, Audio-Visual Bridging (AVB), or others that conform with known ISO, SAE and IEEE standards and specifications, to name but a few.

SRWC system 46 can comprise any suitable components for communicating with intra- and extra-vehicle devices such as mobile devices 22, wireless infrastructure 23, or the like. In at least embodiment—and as described hereafter—the SRWC system 46 is a BLE system utilizing the Bluetooth Low Energy (BLE) protocol. This is merely one embodiment, and other implementations are possible and are contemplated herein. As shown in FIGS. 1-4, the BLE system 46 may comprise a BLE central or gateway node 74 (e.g., a BLE gateway module) and one or more BLE end nodes 72 (e.g., BLE secondary or subsidiary module(s)).

Gateway node 74 may be a single or stand-alone hardware unit or may be part of a VSM 42. In at least one implementation, it is a stand-alone unit coupled to bus 44 and in communication with VSMs 42 via the bus 44. The node 74 may comprise a processor 80, memory 82, instructions 84 digitally-stored on memory 82 (e.g., software programs, firmware programs, or the like), a transceiver 86, and antenna 88. The processor 80 can be any type of device capable of processing and/or executing instructions 84, including microprocessors, microcontrollers, host processors, controllers, vehicle communication processors, and application specific integrated circuits (ASICs). It may be a dedicated processor (used only for gateway node 74), or it can be shared with other vehicle systems. For example, in at least one embodiment, gateway node 74 is part of VIS 40.

Memory 82 may include any non-transitory computer usable or readable medium, which include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes. In at least one implementation, the memory 82 includes non-volatile memory (e.g., ROM, EPROM, EEPROM, etc.). These of course are merely examples; other implementations are contemplated herein.

As will be explained in greater detail below, processor 80 executes digitally-stored instructions 84 which enable the gateway node 74 to communicate with the end nodes 72, the devices 22, 23, as well as the VSM(s) 42 in order to facilitate the performance of one or more vehicle functions (e.g., actuating user-specific settings, vehicle locks, vehicle ignition, etc.). In at least one embodiment, the computing or processing power of the gateway node 74 is substantially less than that of VSMs 42. And in at least one embodiment, the instructions 84 are embodied as a software program specially configured for gateway node 74 enabling the node to carry out at least a portion of the method described herein;

the program comprising: program instructions in source code, object code, executable code or other formats, firmware instructions, hardware description language (HDL) instructions, or the like.

The transceiver 86 and antenna 88 may be adapted to communicate wirelessly with the end node(s) 72. In some implementations, the transceiver 86 is adapted to receive from the end node(s) 72 SRWC data associated with the mobile device 22 or wireless infrastructure 23. Then the node 74 retransmits that SRWC data to the VSM 42 (e.g., using the bus 44)—e.g., to facilitate a vehicle service. While the illustrated embodiment is shown as a SRWC wireless implementation (e.g., end node(s) 72 sending SRWC data wirelessly to the gateway node 74), it should be appreciated that wired implementations are also possible where the end node(s) transmit SRWC data to the gateway node 74 via a discrete connection or bus.

Figure 5:
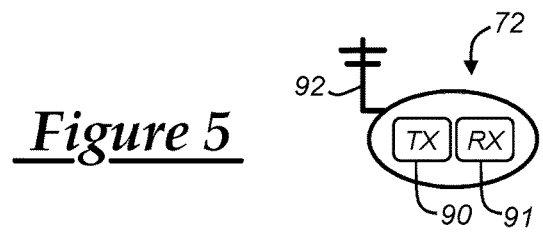
FIG. 5 is a schematic view of one of the end nodes shown in FIG. 4.

The one or more end nodes 72 may include a unique identifier (e.g., used by the gateway node 74 to identify with which node 72 it is communicating). Each of the end nodes 72 comprise an SRWC transmitter 90, an SRWC receiver 91, and at least one associated antenna 92 (see FIG. 5). In at least one implementation, the receiver 91 is adapted to detect SRWC parameters associated with a SRWC communication from mobile device 22 or wireless infrastructure 23 (e.g., a wireless signal strength (e.g., received signal strength indicator or RSSI), an angle of arrival or AoA, a time-of-flight, and/or the like). In at least one implementation, the transmitter 90 is adapted to send SRWC data to the gateway node 74—e.g., and this transmission is not perceived by the mobile device 22 or wireless infrastructure 23, as discussed below. And in at least one embodiment, the transmitter 90 does not communicate with the mobile device 22 or wireless infrastructure 23. Again, the end node(s) 72 may be configured to communicate via a BLE protocol—e.g., detecting BLE parameters and transmitting BLE data from the end node 72 to the gateway node 74.

With regard to the communication link between the gateway and end nodes 74, 72, in at least one embodiment, these nodes 72, 74 may have a pairing relationship (or other similar SRWC association) which is different than the relationship between the end nodes 72 and mobile device 22 (and also different than the relationship between the gateway node 74 and the mobile device 22). For example, the end node—gateway node relationship may include the nodes 72, 74 sharing a unique identifier, a unique communication channel hopping sequence, a unique cryptographic key used for each communication therebetween (e.g., a shared or symmetric encryption key), or any combination thereof. For instance, in at least some BLE communications, the SRWC link between the nodes 72, 74 may utilize a unique secret key to encrypt the data transmitted therebetween; and the nodes 72, 74 may use up to 37 radio frequency (RF) channels and frequency hop among different channels—e.g., in a predetermined or randomized hopping sequence. Thus, it should be appreciated that other SRWC devices (e.g., such as mobile device 22 or wireless infrastructure 23) may not be able to identify and/or decrypt communications between end node 72 and gateway node 74. As will be discussed below, in this manner, non-vehicular devices may perceive the vehicle 24 (e.g., or more specifically, the gateway node 74, VIS 40, etc.) as a single SRWC device.

Figure 2:
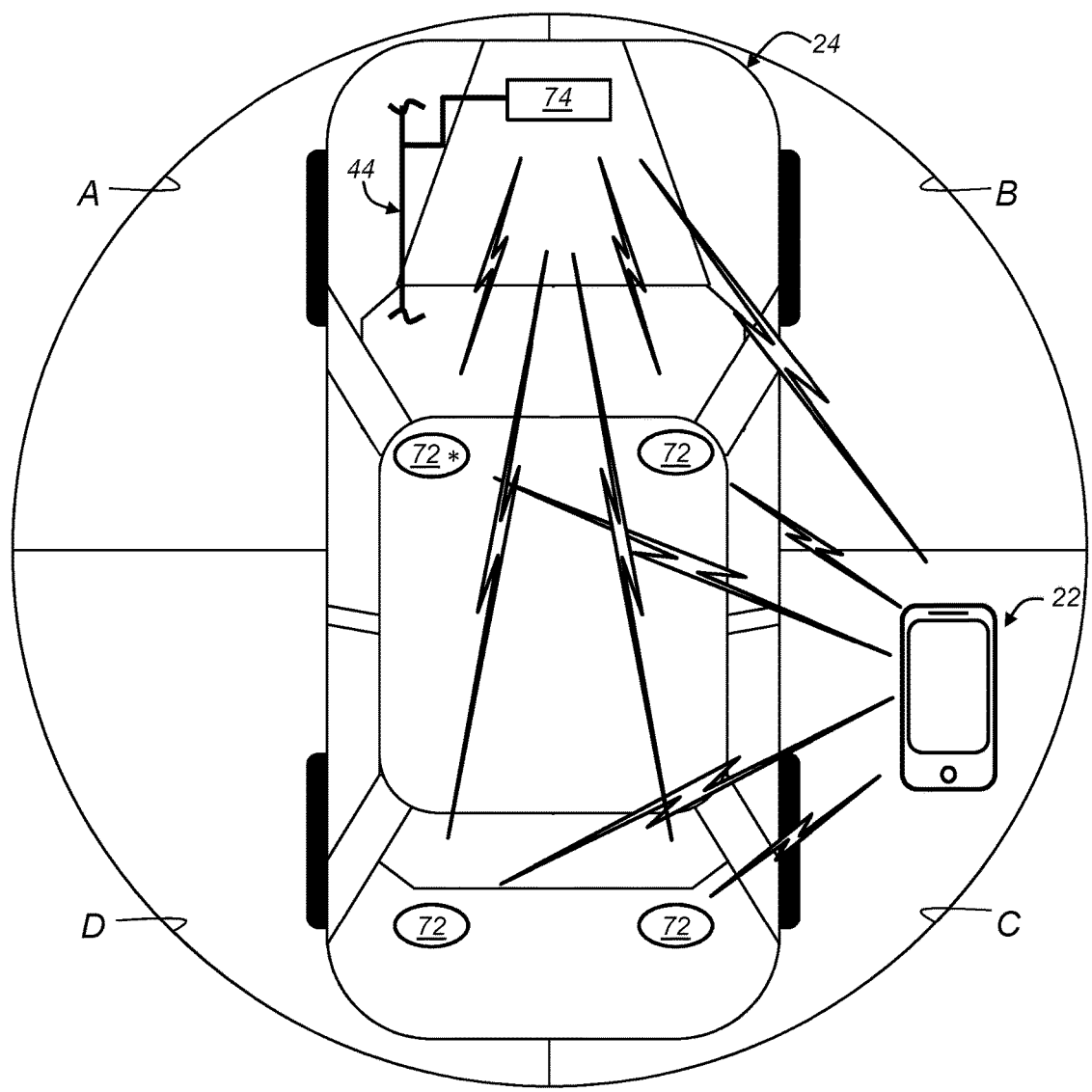
FIG. 2 is a schematic view of a vehicle shown in FIG. 1 having a plurality of short range wireless communication (SRWC) nodes.
Figure 3:
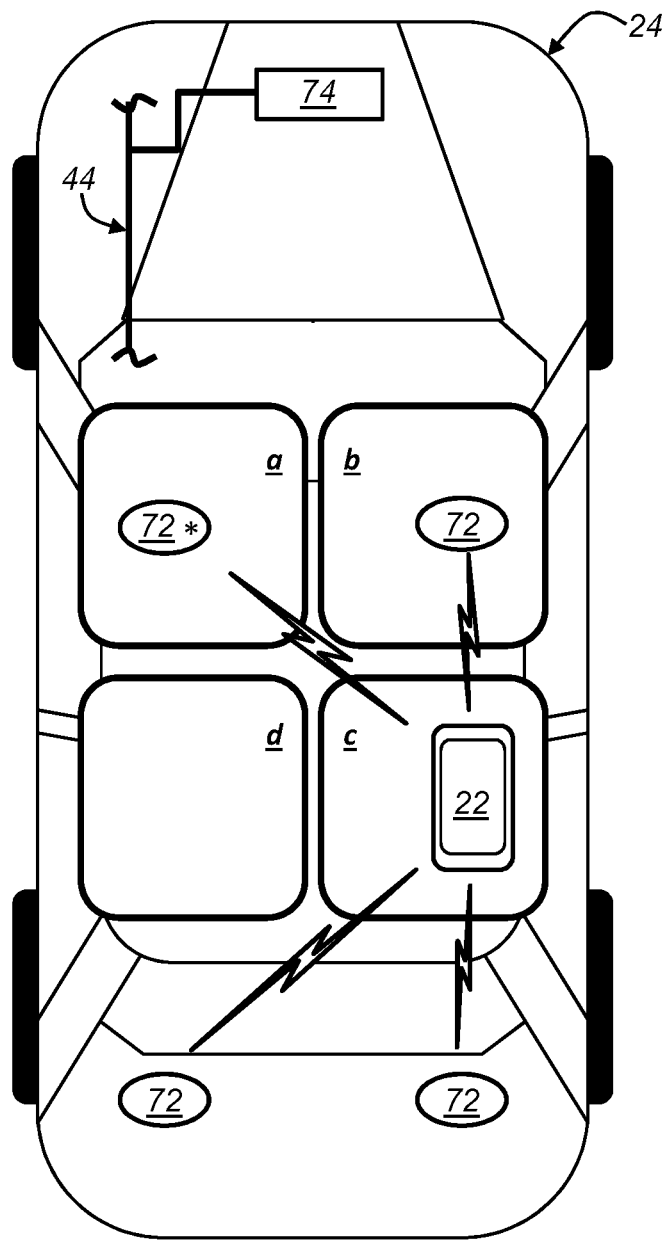
FIG. 3 is another schematic view of the vehicle shown in FIG. 1 having the plurality of SRWC nodes.
Figure 4:
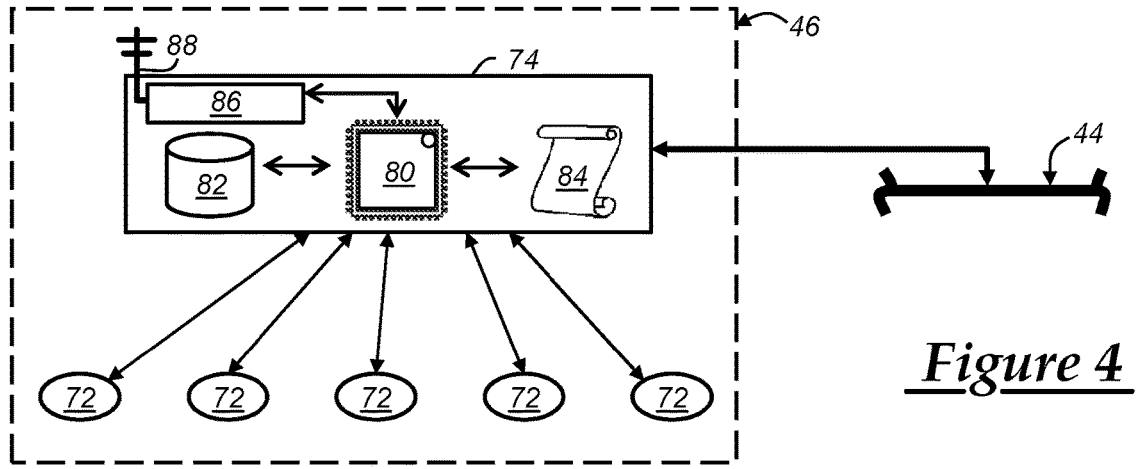
FIG. 4 is a schematic view of a SRWC system in the vehicle which includes a gateway node and end nodes.

FIGS. 2 and 3 illustrate one non-limiting arrangement of BLE end nodes 72, wherein four end nodes 72 are distributed within the vehicle—being located fore and aft, the passenger side having two end nodes and the driver side having two end nodes. In at least one embodiment, this distribution of end nodes may provide redundancy, enable the BLE system 46 to determine the proximity or location of a user, or both. This is merely an example; more or fewer end nodes 72 are possible, and end nodes 72 may be distributed differently as well.

FIG. 2 also illustrates four exterior zones or regions of vehicle 12—e.g., using a clockwise distribution: zone A (9-to-12 o'clock position), zone B (12-to-3 o'clock position), zone C (3-to-6 o'clock position), and zone D (6-to-9 o'clock position). In the illustration, mobile device 22 is located within zone C. As will be explained below, the BLE system 46 may be used to identify the location and/or proximity of the mobile device 22 (or infrastructure 23) with respect to the vehicle 12.

FIG. 3 also illustrates four internal zones or regions of vehicle 12—e.g, again using a clockwise distribution: zone a (9-to-12 o'clock position), zone b (12-to-3 o'clock position), zone c (3-to-6 o'clock position), zone d (6-to-9 o'clock position). In a four-passenger vehicle, these may be correlated to the driver's seat, the front passenger's seat, the right rear passenger's seat, and the left rear passenger's seat, respectively. In the illustration, mobile device 22 is located within zone c. As will be explained below, the BLE system 46 also may be used to identify the location of the mobile device 22 within the vehicle cabin.

It should be appreciated that in other vehicle embodiments, the exterior zones (A, B, C, D) or the internal zones (a, b, c, d) could differ. For example, in vehicles having rear seat infotainment systems, it may be desirable to at least have zone differentiation between front and rear seats, whereas a convertible or sport coupe vehicle may have only driver and passenger zone differentiation. Of course, these are merely examples; other embodiments also exist.

Method

Figure 6:
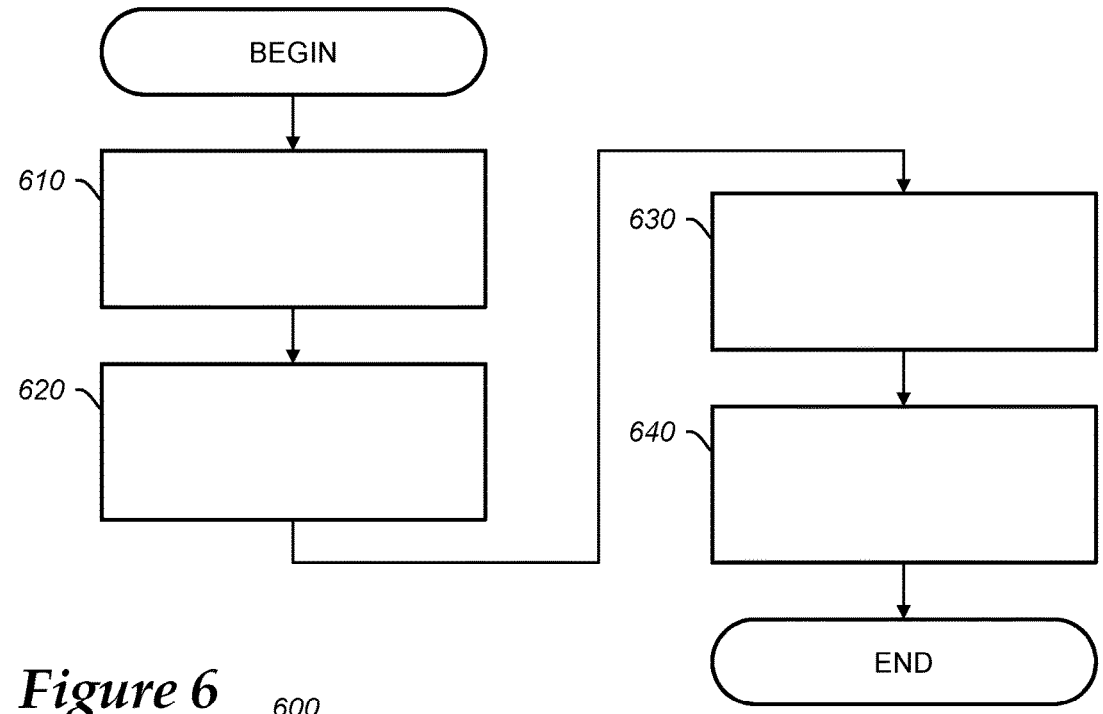
FIG. 6 is a flow diagram of a method of using the SRWC system shown in FIG. 4.

Turning now to FIG. 6, there is a method 600 of using the SRWC system (e.g., the BLE system) 46—and more particularly to waking up one or more nodes of the system 46 when the vehicle ignition is OFF. For illustrative purposes only, four end nodes 72 will be considered (e.g., as arranged in FIG. 2); however, this is not required. Further, an object device—e.g., the mobile device 22—may be located outside of the vehicle cabin in this embodiment (also, as shown in FIG. 2).

Method 600 begins with step 610—the vehicle ignition is switched to OFF and the gateway node 74, as well as three of the end nodes 72, enter a sleep or low-power mode, whereas at least one end node (node 72*) remains active or awake (i.e., in an active mode). In the sleep mode, the gateway node 74 and three end nodes 72 may periodically listen for a wake-up signal from end node 72* (e.g., in one embodiment, node 72* may listen briefly every 2-3 seconds, while sleeping therebetween; and in another embodiment, node 72* may listen less frequently (e.g., once every 10 seconds; e.g., if the vehicle 24 has not been started for a predetermined number of days). These nodes 72, 74 may remain in the sleep mode until commanded to wake-up by the end node 72* or until the next ignition cycle. In the active mode, the end node 72* may be capable of receiving and being responsive to the presence of a SRWC signal (e.g., a BLE signal) from mobile device 22, whereas the nodes in the sleep mode may not sense the presence of the same SRWC signal.

It should be appreciated that all BLE nodes 72, 74 may consume relatively low-power when compared with other SRWC systems; therefore, as used herein, a BLE node in a sleep mode should be appreciated to use less power than a BLE node in the active mode. Further it is anticipated that in at least one embodiment, when active, the gateway node 74 may consume more power than any of the active end nodes 72—e.g., if for no other reason that in one embodiment, the gateway node 74 comprises a processor (e.g., 80), whereas the end nodes 72 may be operable without such a processor. In implementations where the end nodes 72 have processors, processor 80 may be larger and/or consume more power than each end node processor. Regardless, when the vehicle 12 ignition cycle ends (powers down), at least one end node (e.g., 72*) remains active while the remaining nodes 72, 74 enter the sleep mode.

Next, in step 620, a position of the mobile device 22 may move within a range or proximity of vehicle 12 so that end node 72* may detect a BLE signal therefrom (e.g., within 100 meters). Once the end node 72* receives the signal, it may transmit the wake-up signal to the other end nodes 72 and the gateway node 74.

Next, in step 630, the other nodes 72, 74 wake-up as a result of the wake-up signal from end node 72*. In at least one embodiment, this transmission is a BLE signal which is not perceived by the mobile device 22—e.g., as a result of the unique BLE end node—gateway node relationship (which was described above).

In step 640, which follows, the gateway node 74 may communicate with the mobile device 22 using the BLE protocol and the mobile device 22 may perceive the BLE system 46 as a single BLE device. Further, all communications between the mobile device 22 and the BLE system 46 may be between the gateway node 74 and mobile device 22, although the BLE signal sent from the device 22 may be received by the receivers 91 of each end node 72. As will be described in greater detail below, each end node 72 may receive the same BLE signal, but the signal may have different parameters at each of the end nodes; e.g., a different signal strength, a different angle of arrival, a different time-of-flight, etc. And this may be used to determine how close the mobile device 22 is to vehicle 12 and/or what the position of the mobile device 22 is (with respect to the vehicle 12).

Following step 640, the method 600 ends. It should be appreciated that this method may be performed for different mobile devices. Also, at least part of the BLE system 46 could go back to the sleep mode in some circumstances. For example, if the mobile device 22 moved out of range (while the vehicle ignition was still OFF), the gateway node 74 may time-out (or wait a predetermined period of time without a communication or signal from mobile device 22). When the gateway node 74 times-out, it and the three end nodes 72 may go back to the sleep mode while the node 72* remains in the active mode—e.g., until the next ignition cycle or until the end node 72* transmits another wake-up signal.

Figure 7:
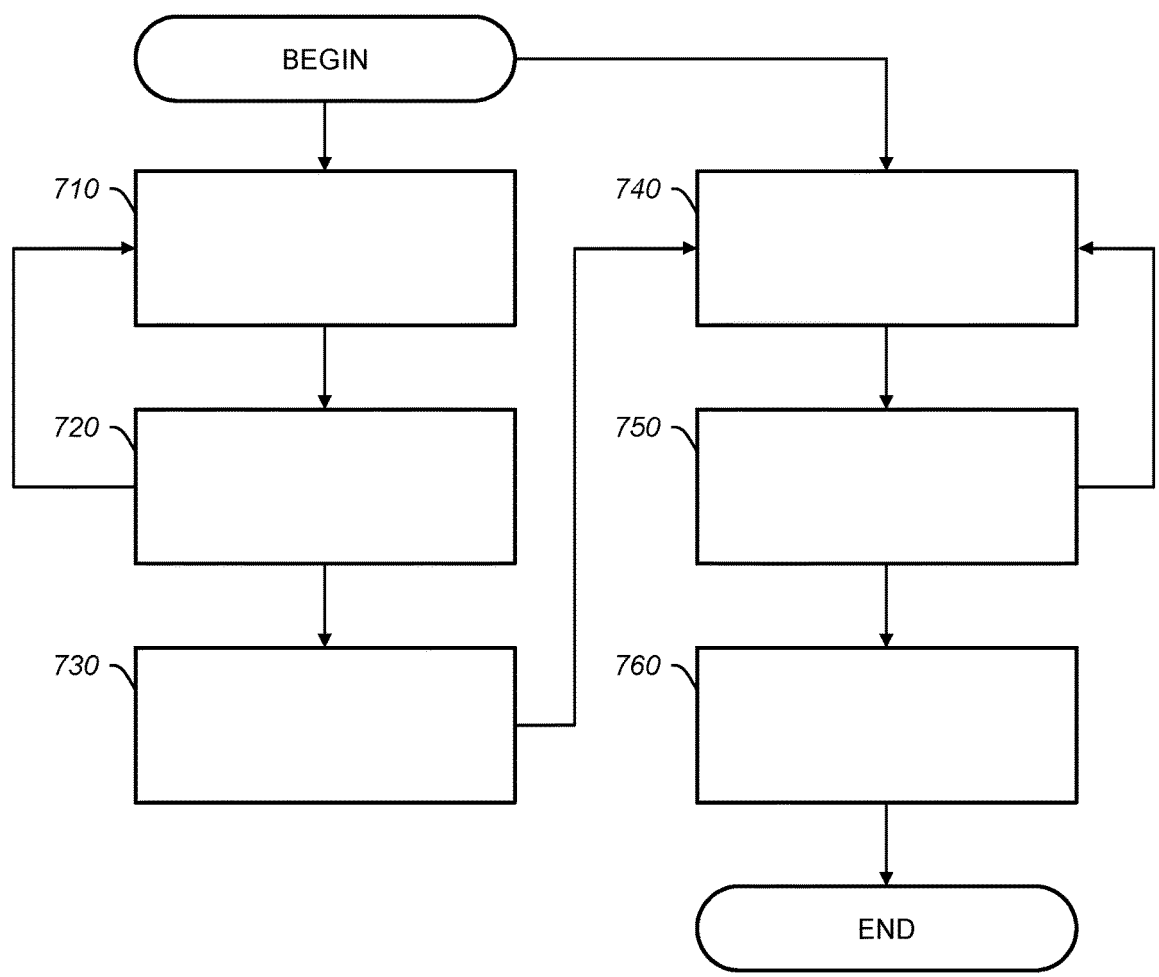
FIG. 7 is a flow diagram of another method of using the SRWC system shown in FIG. 4.

Turning now to FIG. 7, there is a method 700 of using the SRWC system 46 (e.g., the BLE system)—and more particularly to providing application program interface (API) data to one or more VSMs 42 in vehicle 12. Method 700 may occur when the vehicle ignition is ON or OFF and when an object device (e.g., the mobile device 22 or wireless infrastructure 23) is inside or outside of vehicle 12 (e.g., see FIGS. 2-3). Further, while the method also is described with respect to four end nodes 72 (as shown in FIGS. 2-3), it should be appreciated that method 700 could be implemented with one or more end nodes 72 and the gateway node 74. The method begins with step 710 and/or step 740—e.g., in at least one embodiment, these steps may be nearly simultaneous when all the nodes 72, 74 are in the active mode. And they may be in the active mode as a result of a wake-up signal sent from one of the end nodes 72*, as described in method 600, or they may be in the active mode because the vehicle ignition is ON.

In step 710, at least one end node 72 receives a SRWC signal (e.g., a BLE signal) from an object device (e.g., 22 or 23). This step further may include the end nodes determining the SRWC data described above—e.g., determining the position parameters which include one or more of the following: wireless signal strength data, angle of arrival data, time-of-flight data, etc. Or the BLE signal may be received by each of the end nodes 72 and the determination of one or more parameters may be made at the gateway node 74.

Next in step 720, the end nodes 72 may provide the SRWC data to the gateway node 74. Following step 720, the method 700 may proceed by looping back and repeating step 710, proceeding to step 730, or both.

In step 730, the gateway node 74 receives the SRWC data sent from the end nodes 72. As discussed above, the gateway node 74 may determine the position parameters from the SRWC data sent by the end nodes 72, or the gateway node 74 may receive parameter data amongst the received SRWC data. In at least one embodiment, this parameter data may be used by the gateway node 74 to determine the position of the object device (22 or 23). For example, in at least one embodiment, a triangulation technique may be employed by the processor 80 in accordance with instructions 84; however, this is merely an example. Other analogous position-determining techniques also could be used.

In step 740 (which occurs at the initiation of method 700, following step 730, or both), the gateway node 740 communicates with the object device via the BLE protocol. This communication may comprise various forms. For example, node 74 and the object device (22 or 23) may establish communication via a handshake or acknowledgement, the gateway node 74 and the object device may pair (or be previously paired), the gateway node 74 may send/receive commands or requests to/from the object device, the gateway node 74 may send/receive acknowledgements to/from the object device, or the like. Regardless of the form or nature of the communication, the object device (22 or 23) may perceive the BLE system 46 as a single BLE entity.

During the communication with the object device, the gateway device 74 may receive identification data associated with the object device. For example, identification data may comprise a unique identifier of the mobile device 22 or wireless infrastructure 23. This may include a universally unique identifier (UUID) such as a MAC address or the like. The identification data and the parameter data (e.g., position data) collectively may comprise API data; i.e., data which may be used by one or more VSMs 42 to provide a vehicle service to a known or authorized user of the mobile device 22 or user of the vehicle (e.g., based on known nearby wireless infrastructure 23). In at least one embodiment, the identification data is compared with one or more user profiles stored in memory of the VIS 40, and the user/operator of the object device is identified.

In step 750, which follows step 740, the gateway node provides the API data to one or more VSMs 42. And in one embodiment, gateway node provides the API data to the VIS 40 (e.g., via connection 44 or wirelessly). Following step 750, the method 700 may proceed by looping back and repeating step 740, proceeding to step 760, or both.

Next in step 760, in response to receiving the API data, the VSM(s) 42 perform one or more vehicle functions or provide a vehicle service to the user. To illustrate, when the mobile device 22 is identified and the position data indicates it is relatively nearby (e.g., 10 meters away), then the VSM 42 may unlock a vehicle door or doors, turn the vehicle ignition ON, configure climate control settings within the vehicle cabin, provide infotainment services to a particular display in the vehicle, and/or the like. Additionally, other vehicle sensor data could be used with the API data. For example, when the API data indicates an approaching user (e.g., identifying an approaching and authorized mobile device 23), other sensors in the vehicle could indicate a rear passenger door was opened and closed prior to the driver's seat being occupied and, e.g., the VSM 42 could determine an infant seat has been occupied based on the API data combined with the other vehicle sensor data. Thereafter, the VIS 40 (or other VSM 42) could provide vehicle services associated with an infant (e.g., infotainment services, climate control, etc.).

To illustrate an example using wireless infrastructure 23, consider the API data providing an identification of a drive-through or take-out restaurant to a VSM 42 when the vehicle 12 approaches the restaurant. The restaurant could be notified via a BLE signal from the gateway node 74 or telematics unit 42 that the user (customer) associated with the take-out order has arrived to pick up. These of course are merely examples and not intended to be limiting. One or more of these vehicle services may be performed automatically or based on user actuation (e.g., at the VIS interface). Ultimately, API data may be used by a variety of VSMs 42 in vehicle 12, and system architects will appreciate other ways in which this API data may be utilized.

Following step 760, the method 700 ends. Based on the description above, it should be appreciated that methods 600 and 700 can be executed singly or in combination with one another.

Other embodiments exist as well. For example, the end nodes 72 of the SRWC system 46 may be configured using software. In at least one implementation, the end nodes 72 comprise one or more processors (e.g., but may still consume less power in some embodiments, e.g., less than the gateway node 74). The architecture of SRWC system 46 may enable the gateway node 46 to provide software updates or encryption updates to the end nodes 72. However, in at least one implementation, the unique identifiers of the end nodes 72 are authenticated by the gateway node 74 without use of encryption techniques.

In at least one embodiment, the gateway node 74 may be the node that remains active or awake while the end nodes 72 enter a sleep mode. Thus for example, when mobile device 22 approaches the vehicle 24, the gateway node 74 may command the end nodes 72 to wake up.

In still other embodiments, the gateway node 74 provides a variety of other data to the end nodes 72. For example, the gateway node 74 may transmit to the end nodes 72 data pertaining to the vehicle 12—e.g., the vehicle model, whether the vehicle is a work or personal vehicle, and even information concerning the identity of the object device (e.g., 22 or 23). For example, in one embodiment of step 620 (described above), when end node 72 detects mobile device 22 (e.g., now within the vehicle proximity), the end node may compare an identifier provided by the mobile device 22 to an identifier previously provided to and stored at the end node 72 (e.g., in memory). If the stored identifier matches the identifier received from the mobile device 22, then the end node 72 transmits the wake-up signal to the other end nodes 72 and gateway node 74. The gateway node 74 may store this mobile device identifier (or it may be stored in any other suitable location, e.g., such as the VIS 40). This identifier may be stored as a result of a previous pairing (or other identification) between the gateway node 74 and the mobile device 22, between the VIS 40 and the mobile device 22, or the like. And of course, in at least one embodiment, the gateway node 74 performs the waking-up (e.g., having determined that the mobile device 22 was previously identified—using its identifier).

In another example, the gateway node 74 may transmit data pertaining to a software update to the end nodes 72. For example, this may be a query or a verification of which software version the end nodes 72 are running; or in other embodiments, it may simply be a transmission of the software update itself (e.g., wherein the gateway node 74 knows which end nodes 72 are in need of an update). Of course, the respective end nodes 72 may reply to such queries, communications, etc., as well.

In another embodiment, the position data (in the API data) is used to determine a relative proximity of the object device. For example, when the processor 80 (in gateway node 74)—using the API data—determines that the object device is in a fringe region of BLE coverage around vehicle 12, the processor 80 may determine to ignore the object device (at least until the object device is closer to the vehicle 12). And when the API data is used to determine an authorized user (e.g., a parent's mobile device) and when the API data indicates that the authorized user is within a predetermined threshold distance of vehicle 12, a VSM 42 may auto-start the vehicle ignition. Similarly, when the API determines another authorized user (e.g., a child's mobile device) and determines that the child enters the vehicle 12, the VSM 42 may not auto-start the vehicle 12; instead, the VIS 40 may provide Wi-Fi services to the child's mobile device.

In another embodiment, the user's location within the cabin may be determined (e.g., see FIG. 3) using the end nodes 72. This API (position) data may be provided to one or more VSMs 42, which may in turn provide vehicle services unique or associated with that position within the cabin. For example, streaming video may be provided to an object device in a passenger seat but not in the driver's seat; or preconfigured climate control settings may be provided to the zone of the object device (e.g., presuming the associated user is there too). Other examples will be apparent to skilled artisans.

It should be appreciated that in at least one embodiment, no vehicle services or vehicle functions may be performed when the API data indicates an unknown object device (e.g., the identification data is unknown or the identification data indicates an unauthorized user). In these instances, the remaining API data—i.e., the position data—may be ignored altogether.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A short range wireless communication (SRWC) system for a vehicle, comprising:
a plurality of SRWC end nodes in the vehicle having a SRWC receiver and a SRWC transmitter; and
an SRWC wired node in the vehicle adapted to send and receive SRWC data,
wherein the plurality of SRWC end nodes and the SRWC wired node are configured so that, when the plurality of SRWC end nodes and the SRWC wired node are operable, an SRWC object device perceives the plurality of SRWC end nodes and the SRWC wired node as a single SRWC device, wherein the SRWC wired node is hardwired to a communications bus of the vehicle so that the SRWC wired node can send and receive messages over the communications bus, wherein the SRWC wired node and the plurality of SRWC end nodes are configured such that only the SRWC wired node is hardwired to the communications bus, wherein each of the plurality of SRWC end nodes is configured to receive a SRWC signal from the SRWC object device and is configured to send SRWC data pertaining to the SRWC object device to the SRWC wired node, wherein the SRWC system is configured to determine a location of the SRWC object device based on the SRWC data pertaining to the SRWC object device.

2. The SRWC system of claim 1, wherein the plurality of SRWC end nodes and the SRWC wired node each transmit and/or receive one or more communications with the SRWC object device, and wherein the SRWC object device is an SRWC-enabled mobile device or an SRWC-enabled infrastructure.

3. The SRWC system of claim 1, wherein at least one of the plurality of SRWC end nodes is configured to remain powered when the vehicle ignition is powered OFF, wherein the second SRWC node is configured to enter a sleep mode when the vehicle ignition is powered OFF and to wake-up when triggered in the sleep mode by the first SRWC node.

4. The SRWC system of claim 1, wherein each of the plurality of SRWC end nodes is a Bluetooth Low Energy (BLE) end node and the SRWC wired node is a BLE gateway node.

5. The SRWC system of claim 4, wherein the SRWC data associated with the location of the SRWC object device comprises signal-strength data, angle of arrival data, time-of-flight data, or any combination thereof.

6. The SRWC system of claim 4, wherein, when the vehicle ignition is powered OFF: the BLE gateway node enters a sleep mode and the at least one of the BLE end nodes is configured to trigger a wake-up of the BLE gateway node when the at least one BLE end node receives the SRWC signal from the SRWC object device.

7. The SRWC system of claim 1, wherein the SRWC wired node further comprises memory storing instructions executable by a processor in the SRWC wired node, wherein the instructions when executed by the processor cause the SRWC wired node to carry out the following steps after receiving at the SRWC wired node a wake-up signal from at least one of the plurality of the SRWC end nodes that was sent in response to a detection of the SRWC signal from the SRWC object device at the at least one of the plurality of the SRWC end nodes when the vehicle is powered off:
exiting a sleep mode of the SRWC wired node in response to the wake-up signal received from the at least one of the plurality of the SRWC end nodes; and thereafter
receiving SRWC data at the SRWC wired node from the SRWC object device via the at least one of the plurality of the SRWC end nodes.

8. The SRWC system of claim 7, wherein each of the plurality of SRWC end nodes is a Bluetooth Low Energy (BLE) end node and the SRWC wired node is a BLE gateway node.

9. The SRWC system of claim 8, wherein the instructions when executed by the processor further cause the BLE gateway node to:
in response to the wake-up signal from at least one of the plurality of SRWC end nodes, receive additional SRWC data at the BLE gateway node from each of the plurality of BLE end nodes; and
determine a location of the SRWC object device based on the additional SRWC data,
wherein the additional SRWC data comprises signal-strength data, angle of arrival data, time-of-flight data, or any combination thereof.

* * * * *